United States Patent
Andacht et al.

(10) Patent No.: US 6,397,777 B1
(45) Date of Patent: Jun. 4, 2002

(54) METHOD FOR WINDOWING EGGS

(75) Inventors: Tracy M. Andacht, Athens; Robert D. Ivarie, Watkinsville, both of GA (US)

(73) Assignee: University of Georgia Research Foundation, Inc., Athens, GA (US)

( * ) Notice: Subject to any disclaimer, the term of this patent is extended or adjusted under 35 U.S.C. 154(b) by 0 days.

(21) Appl. No.: 09/783,176

(22) Filed: Feb. 14, 2001

(51) Int. Cl.$^7$ ................................................ A01K 45/00
(52) U.S. Cl. .......................................................... 119/6.8
(58) Field of Search .................................. 119/6.8, 300

(56) References Cited

U.S. PATENT DOCUMENTS

| | | | |
|---|---|---|---|
| 3,120,834 A | | 2/1964 | Goldhaft et al. |
| 4,593,646 A | * | 6/1986 | Miller et al. ................. 119/6.8 |
| 5,339,766 A | * | 8/1994 | Phelps et al. ................. 119/6.8 |
| 5,438,954 A | | 8/1995 | Phelps et al. ................. 119/6.8 |
| 5,897,998 A | | 4/1999 | Speksnijder et al. ........ 435/349 |

OTHER PUBLICATIONS

"Limitations in the use of the early chick embryo as a teratological model"; R.A. Mann, K.L. Moore, T.V.N. Persaud, Teratology 7, A22–A23, 1973

"Embryogenesis of open neural defects in the chick embryo"; R.A. Mann, T.V.N. Persaud; Anat. Rec. 190, 468–469, 1978.

"Histogenesis of Experimental Open Neural Defects in the Early Chick Embryo"; R.A. Mann, T.V.N. Persaud, Anat. Anz. 146, 171–187, 1979.

"A New Method for Making an Artificial Air Space on Top of Fertilized Avian Eggs"; M. Callebaut, Poultry Science 60, 723–725, 1981.

"The Use of Early Chick Embryos in Experimental Embryology and Teratology: Improvements in Standard Procedures"; M. Fisher, G.C. Schoenwolf, Teratology 27, 65–72, 1983.

"Animal Model: Causes of Windowing–Induced Dysmorphogenesis (Neural Tube Defects and Early Amnion Deficit Spectrum) in Chicken Embryos"; R.M. Fineman, G.C. Schoenwolf, M. Huff, P.L. Davis, American Journal of Medical Genetics 25, 489–505, 1986.

"Animal Model: Dysmorphogenesis and Death in a Chicken Embryo Model"; R.M. Fineman, G.C. Schoenwolf, American Journal of Medical Genetics 27, 543–552, 1987.

"Germline Transmission of Exogenous Genes in the Chicken"; R.A. Bosselman, R.Y. Hsu, T. Boggs, S. Hu, J. Bruszewski, S. Ou, L. Kozar, F. Martin, C. Green, F. Jacobsen, M. Nicolson, J.A. Schultz, K.M. Semon, W. Rishell, R.G. Stewart, Science 243, 533–535, 1989.

"Production of somatic and germline chimeras in the chicken by transfer of early blastodermal cells"; J.N. Petitte, M.E. Clark, G. Liu, A.M. Verrinder Gibbins, R.J. Etches, Development 108, 185–189, 1990.

"Somatic and Gerline Chicken Chimeras Obtained from Brown and White Leghorns by Transfer of Early Blastodermal Cells"; P. Thoraval, F. Lasserre, F. Coudert, G. Dambrine, Poultry Science 73, 1897–1905, 1994.

"Germline transmission of exogenous genes in chickens using helper–free ecotropic avian leukosis virus–based vectors"; P. Thoraval, M. Afanassieff, F. L. Cosset, F. Lasserre, G. Verdier, F. Coudert, G. Dambrine, Transgenic Research 4, 369–376, 1995.

\* cited by examiner

*Primary Examiner*—Robert P. Swiatek
(74) *Attorney, Agent, or Firm*—Judy Jarecki-Black

(57) ABSTRACT

A method of manipulating an egg or an embryo therein, preferably a chicken egg or embryo, and sealing the egg shell with a heat melted composition. The present invention provides a method whereby a hole in an egg shell may be optionally resealed with a patch from an egg shell membrane and covered by a heat sealed composition. The present invention further provides a method to expel air introduced into the egg during manipulation by expanding the air sac of the egg.

35 Claims, 3 Drawing Sheets

METHOD FOR WINDOWING EGGS

FIELD OF THE INVENTION

The present invention relates to an improved method of windowing eggs, particularly fertilized eggs. The present invention further relates to methods for the resealing of eggs using a heat softened composition.

BACKGROUND

The wide interest in manipulating the avian genome, for applications ranging from enhancing traits of domestic poultry to the production of heterologous proteins within the egg, has resulted in intensive efforts to apply transgenic technology to poultry. In developing strategies for gene transfer, several features are desired including the ease of obtaining large numbers of embryos for manipulation, ease of accessing the embryo, and a low level of mosaicism. However, gaining access to the early embryo has posed several challenges due to the complex early life history of the avian embryo.

Access to the early embryo without jeopardizing future embryo development is critical to successful in vivo gene manipulation in birds. When laid, the avian embryo consists of a blastoderm containing 30,000–60,000 cells on top of the yolk and encased in a hard calcified egg shell. Immediately below the shell is the egg shell membrane that surrounds the egg white, the egg yolk and the developing embryo. The hard egg shell and large yolky egg of the avian embryo pose a significant obstacle to manipulating the embryo.

The first 24 hours of development of the chicken embryo take place within the oviduct of the hen, producing an embryo that is packaged for morphogenesis and growth over the next 21 days (Romanoff & Romanoff, 1949). Many procedures, including transgenic modification of the avian genome, require access to the interior of the egg. For example, in one method of modifying the genetic material of a chicken, a small volume of liquid containing retroviral transducing particles or transfected donor cells must be injected into the subgerminal cavity of the recipient embryo. In addition, it may be desirable to expose the developing embryo to antigens, viruses, vaccines, or growth factors. Disrupting the environment of the embryo during development can adversely affect its chance of survival (eg. Mann et al., 1973). Despite these challenges, several strategies have been devised to make gene transfer possible in poultry. Each targets a different stage of embryonic development, and each has varying degrees of success.

One approach targets the pluripotent Stage X blastoderm (Eyal-Giladi & Kochav, 1976) from a freshly oviposited egg (Eyal-Giladi, 1984). In one method to access the embryo, a small window is drilled through the egg shell and genetically modified cells from a donor Stage X embryo (Eyal-Giladi & Kochav, 1976) or retroviral particles are injected into the subgerminal cavity immediately below the blastoderm (Bosselman et al., 1989; Brazolot et al., 1991; Fraser et al., 1993; Thoraval et al., 1995). To provide access to the interior of the egg and the embryo, the underlying egg shell membrane is cut away with a scalpel and 2–10 microliters of experimental solution is microinjected into the embryo. The hole is then sealed in one of several ways.

Most commonly, the hole is covered with fresh egg shell membrane from a donor egg, with the membrane applied in the same orientation as in the egg, i.e., albumen-side down. When the membrane dries, it is permanently sealed with plastic model cement or a gas permeable surgical membrane. See also Carsience et al. (1993), and Fraser et al. (1993).

Other similar methods have been used to access the developing embryo. Thus, Thoraval et al. (1995) remove a triangular piece of shell, inject 10 $\mu$l of experimental solution through the opening into the embryo, then seal the egg by replacing the shell piece and covering it with adhesive tape. Marzullo, G. (1970) cuts a hole in the shell, covers it with a glass cover slip, and seals it with paraffin wax. This procedure is fast and easy, allowing large numbers of embryos to be manipulated. However, this approach results in compromised embryo survival. Typically, less than 10% hatch (Petitte et al., 1990; Thoraval et al., 1994, 1995). It is believed that residual air within the egg after sealing the window results in embryonic defects and death (Mann et al., 1973; Fisher & Schoenwolf 1983; Fineman et al., 1986; Fineman & Schoenwolf 1987).

Direct comparison of the various published results is complicated, however, because the time of windowing and termination varied. Fineman et al. (1986) found that survival rates increased as the incubation time prior to windowing increases. In addition, the percentage of abnormal embryos observed using this windowing method increased as the incubation time after windowing increased (Fisher & Schoenwolf 1983; Fineman & Schoenwolf 1987).

Culturing Stage X embryos (Eyal-Giladi & Kochav, 1976) through a series of surrogate shells (Perry, 1988; Naito & Perry, 1989; Naito et al., 1990) improves hatch rates to between 20% and 60%. However, this method is labor-intensive and time-consuming, and defeats the advantage of manipulating this stage of development.

Speksnijder et al, in U.S. Pat. No. 5,897,998, teach filling the air space created during windowing with an aqueous solution before sealing to increase hatchability of eggs subject to manipulation. However, the present inventors found that, in as many as 40% of the eggs, the method of Speksnijder et al results in the presence of air bubbles immediately below the air sac at candling, resulting in decreased hatchability. Candling the eggs after windowing revealed that these bubbles were not present prior to incubation, suggesting that an imperfect seal may be formed using the method of Speksnijder et al.

What is needed, therefore, is a method of windowing avian eggs that avoids the pitfall of early death of the embryo, thereby making windowing effective for the rapid and efficient production of transgenic birds. What is further needed is a method to minimize residual air in the egg during the windowing process before sealing the egg.

These and other objectives and advantages of the invention will become fully apparent from the description and claims that follow or may be learned by the practice of the invention.

SUMMARY OF THE INVENTION

This invention provides a method for manipulating the contents of eggs. A first opening is made in the egg shell, and the underlying egg shell membrane is cut away. After manipulation of the egg or embryo, the opening in the egg shell is resealed by applying a heat softened composition, such as a hot melt glue. Any air bubbles introduced into the interior of the egg upon cutting of the underlying egg shell membrane can optionally be removed by expanding the air sac of the egg through a second opening in the egg shell and forcing undesirable air bubbles out through the first opening by displacement of the egg white and the yolk. The egg is manipulated as described above and then incubated to allow development of the embryo. The incubation is maintained until the embryo is hatched from the egg. The invention improves hatchability of fertilized eggs following embryo manipulation.

Suitable eggs for application of the methods of the present invention are avian eggs including, but not limited to, eggs of the ratite, chicken, turkey, quail, duck, pheasant and goose. The egg may contain an embryo. The invention is suitable for any commercial application requiring accessing an egg and microinjection of a solution into the egg and/or an embryo. For example, genetically modified cells, attenuated viruses, antigens, growth factors and cytokines may be microinjected. The invention provides improved hatchability following the incubation of manipulated fertilized eggs. This aspect may be useful when large numbers of injections are required, for example, in the production of genetically manipulated and transgenic animals.

Additional objects and aspects of the present invention will become more apparent upon review of the detailed description set forth below when taken in conjunction with the accompanying figures, which are briefly described as follows.

DETAILED DESCRIPTION OF THE PREFERRED EMBODIMENTS

Figure 1:
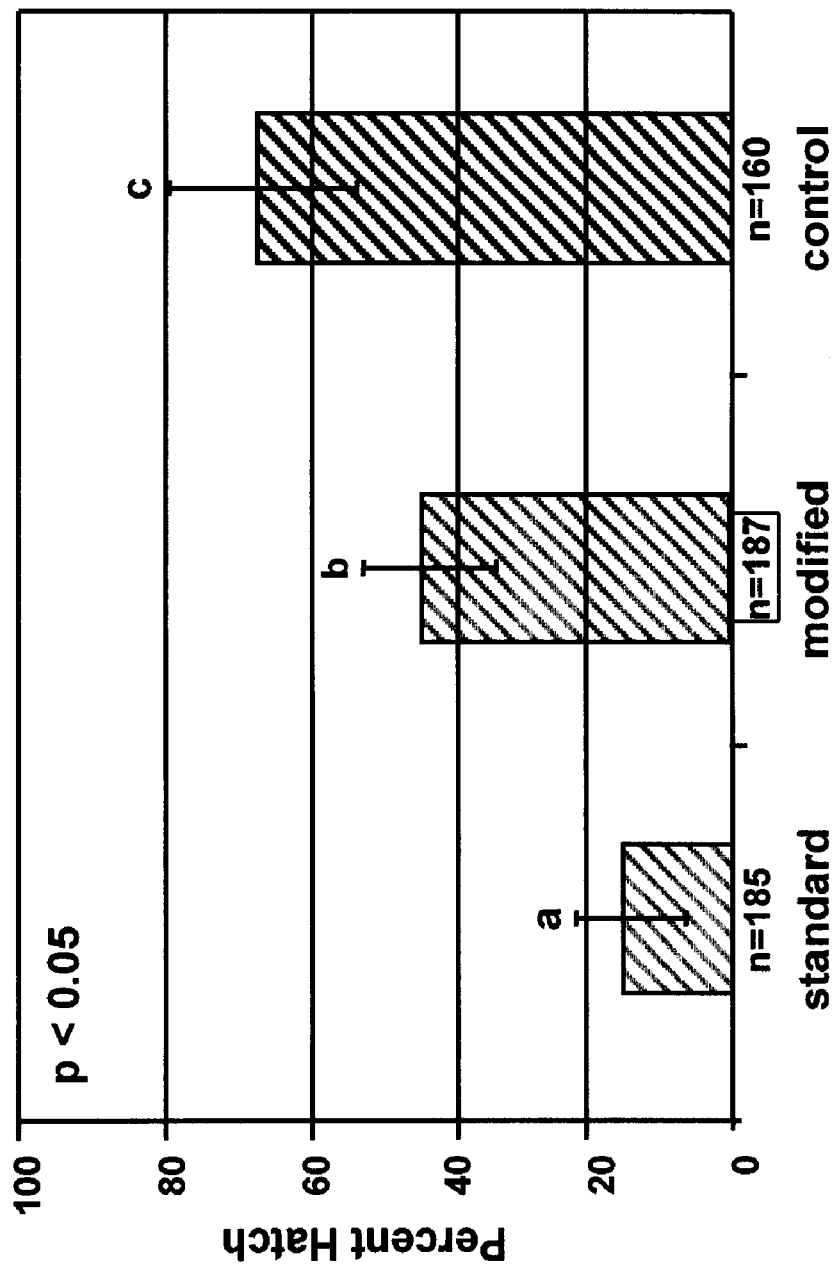
FIG. 1 illustrates the effect of different windowing techniques on hatchability. Hatch rates from (left to right): the standard windowing technique, the modified windowing technique (hot melt glue plug), and non-windowed controls.

A full and enabling disclosure of the present invention, including the best mode known to the inventor of carrying out the invention is set forth more particularly in the remainder of the specification, including reference to the Examples. This description is made for the purpose of illustrating the general principles of the invention and should not be taken in the limiting sense.

Definitions

The terms "bird and "avian" as used herein refer to males or females of any avian species, but are primarily intended to include poultry commercially raised for eggs, meat for consumption or for providing eggs for research or medical purposes such as viral or microbial proliferation. The present invention, therefore, may be practiced with any type of bird egg, including but is not limited to eggs of the chicken, turkey, duck, goose, quail, pheasant, grouse or ratites. Ratites include flightless birds including ostrich, emu, cassowary and kiwi. Chicken and turkey eggs are preferred, with chicken eggs the most preferred. It is contemplated that the methods of the present invention could be applied to non-avian shelled eggs from, but not limited to, reptilian eggs such as a turtle egg, a crocodile egg, an alligator egg or the like.

The term "hatchability" as used herein refers to the fraction of fertilized eggs that hatch a viable chick.

The term "blastoderm" as used herein refers to the disc of cells overlying the subgerminal cavity usually containing 30,000–60,000 cells at oviposition.

The terms "heat melted composition" or "heat softened composition" as used herein refer to any composition of natural or artificial origin that is solid or gel-like at one temperature and liquefies on the application of a heat source. When the heat source is removed, the liquefied composition will cool and revert to the original solid or gel form. Heat softened compositions within the scope of the present invention include, but are not limited to, hot melt glues, gelatin gels, gelatin-glycerol compositions, and waxes. Waxes may include, but are not limited to: paraffin waxes comprising mixtures of high molecular weight solid hydrocarbons; natural waxes such as, but not limited to beeswax, lanolin, shellac wax; vegetable waxes including carnauba, candelilla; and synthetic waxes including ethylenic polymers, polyol ether-esters, and chlorinated napthalenes. It is preferred that the heat softened compositions of the present invention are non-toxic and therefore physiologically inert to a developing embryo. It is further preferred that the melting point of the heat softened or heat melted compositions be below a temperature that would harm the viability of the embryo or the contents of the egg.

The term "windowing" as used herein refers to cutting, grinding or otherwise removing an area of an egg so as to allow access to the contents of the egg, including an embryo. Also included within the general term "windowing" are methods by which the window is sealed to allow further development of the embryo.

The term "manipulation" of an egg as used herein refers to altering the contents of an egg by such methods as, for example, microinjection into and microdissection of an embryo, blastoderm or the overlying membranes thereof.

Egg Manipulation

This invention provides methods of manipulating an egg comprising obtaining a first egg having a shell and an air sac, wherein a shell membrane underlies the shell, making a first opening in the shell of the avian egg, removing the shell membrane exposed by the first opening in the shell, manipulating the egg, and sealing the first opening in the egg shell with a heat melted composition. The melting point of the heat melted compositions will preferably be below a temperature that would harm the viability of the embryo or the contents of the egg.

The egg to be manipulated may contain an embryo at the blastoderm stage or later. The egg may be an avian egg selected from the group consisting of turkey, chicken, quail, duck, pheasant, and goose or ratite. Preferably the egg is a chicken egg.

The egg may be manipulated by microinjection through the opening of an embryo-containing egg. The opening may be into the area around and in close proximity to the embryo.

Another aspect of this invention is improved hatchability following the manipulation, as described above, of an egg that contains an embryo. The resealed manipulated egg is incubated to allow development of the embryo. The incubation is maintained until the embryo is viably hatched from the egg.

One embodiment of the present invention comprises a method for manipulating a chicken egg containing a blastodermi. The method comprises obtaining a laid avian egg which has been stored at 6° C. usually for not more than two days and contains a blastoderm, making an opening in the shell of the egg without breaking the underlying egg shell membrane, removing the shell membrane exposed by the first opening in the egg shell, manipulating the egg, sealing the first opening with a heat melted composition, incubating the sealed egg to allow development of the embryo, and maintaining the incubation until the embryo is viably hatched from the egg.

In one embodiment of the method of the present invention, the first opening in the egg shell is sealed with a plug comprising a heat melted composition applied to the egg such that the plug fills the space between the shell opening and the membrane while forming an occlusive seal in and around the opening of the egg. The heat melted composition may be applied over, under, or around the opening in the egg shell. The melting point of the heat melted composition will preferably be below a temperature that would harm the viability of the embryo or the contents of the egg. It is also contemplated to be within the scope of the present invention for a patch to be secured to the shell by a heat melted composition. In one embodiment of the present invention, the patch may be a fragment of an egg shell membrane obtained from a second egg. However, one of skill in the art will recognize that a patch suitable for use in the present invention may be formed from any material that will cover the opening in the shell while adhering to the heat melted composition.

Another aspect of the present invention provides a method to reduce the volume of air introduced beneath the first opening in the egg shell; the method comprising making a second opening in the shell in the proximity of the air sac, and expanding the volume of the air sac. It is contemplated to be within the scope of the present invention for the air sac to be expanded by injecting into the sac a gas such as ambient air, oxygen, nitrogen, argon, helium or any other gas that will not harm the viability of the embryo or the egg. The air sac may also be expanded by injection of a physiologically inert fluid such as, but not limited to, saline, oil, emulsions, albumen solution or the like that will not harm the viability of the embryo or the egg. The resulting expansion of the air sac displaces the egg contents against the first opening, thereby expelling introduced air bubbles that may prove harmful to the developing embryo. The second hole may be resealed using any of the methods of the present invention including, for example, applying a heat melted composition.

The present invention is further illustrated by the following examples, which are provided by way of illustration and should not be construed as limiting. The contents of all references, published patents and patents cited throughout the present application are hereby incorporated by reference in their entirety.

EXAMPLE 1

Chickens and Eggs

Hens were artificially inseminated on a weekly basis and were continually replaced throughout the course of this study. Eggs were used fresh, or stored between about 6° C. and about 8° C. for up to 2 days before use.

EXAMPLE 2

Windowing Eggs

Fertile White Leghorn eggs were swabbed with 70% ethanol and allowed to equilibrate to room temperature. Eggs collected on the same day were subdivided equally into the different treatment groups. Eggs were placed horizontally with respect to their long axis, and a 5 mm diameter hole was ground through the egg shell in the uppermost part of the egg using a drill fitted with a DREMEL™ #925 aluminum oxide spherical grinding stone where keeping intact the underlying shell membrane according to the method of Hamburger V., A (*Manual of Experimental Embryology,* Revised Ed. Uni. Chicago Press, Chicago (1960) and incorporated herein by reference in its entirety). The exposed shell membrane was removed by cutting beneath the edge of the egg shell using a sharp #11 surgical blade and grasping the piece of membrane with a fine forceps, without removing egg albumen with the shell membrane. Except for eggs to be injected, no attempt was made to determine the viability or developmental stage of embryo at the time of windowing.

In the standard Window Sealing windowing procedure, the window was covered with a hot glue plug, using a low melting point hot melt glue applied with a glue gun (STANLEY GR90C). The entire window and its edges were covered with hot melt glue, rotating the egg contents past the window to allow any air bubbles created during the windowing procedure to pass up through the liquid sealant. No additional membrane fragment was added to the window.

In an alternate embodiment of the present invention, the window was covered with a fragment of shell membrane, about 1 cm square, obtained from a freshly laid Barred Rock egg. The membrane fragment was placed in the same orientation as in the egg, i.e., with the egg albumen side down. After the shell membrane was dry, the membrane was sealed with the low melting point hot melt glue as described above.

To add air before sealing with hot melt glue, one or two air bubbles, approximately the size of the window, were created in the egg albumen using a pasteur pipet. The egg was tilted to one side to move the air bubbles away from the window before sealing with hot melt glue.

To completely remove air from within the egg before sealing the window, a partial window was created at the blunt end of the egg, immediately above the air sac, by grinding a hole, approximately 5 mm in diameter, through the egg shell, leaving the egg shell membrane intact. The egg was returned to a horizontal position, and air was gently blown into the air sac through the partial window at the blunt end of the egg using plastic tubing. When the egg contents were elevated to the edge of the window, the window was sealed with hot melt glue. After the hot melt glue hardened, the partial window on the blunt end of the egg was sealed with a small dab of hot melt glue.

EXAMPLE 3

Embryo Injection

For embryo injection, eggs were placed on their side in egg flats for several hours before windowing. After removing the shell and shell membrane, the underlying blastoderm was located by rotating the yolk past the window under illumination from a fiber-optic light source. Only a blastoderm at or near Stage X as defined by Eyal-Giladi & Kochav (1976) was injected. Approximately 5 $\mu$l of tissue culture media was injected by mouth pipet into the subgerminal cavity underlying the blastoderm using a pulled 50 $\mu$l micro-pipet (50–60 $\mu$m OD at the tip). The pipet was rested on the edge of the window during the injection to decrease damage to the embryo. The tip of the pulled pipet was marked with a permanent marker to judge the depth of injection, and a small amount of media was left in the pipet tip after injection to prevent injecting air into the subgerminal cavity. All eggs were incubated narrow end down in a humidified incubator at 38° C./60% relative humidity (RH), rotating through 40° every hour, for 18.5 days. Eggs were then placed in hatching baskets and incubated at 37° C./80% RH.

Only strong, healthy chicks were counted as successful hatchlings. The number of unfertilized eggs in each group was determined by candling eggs after 7 days of incubation and opening and examining those eggs rejected and removed at candling. The total number of eggs set were adjusted by the number of unfertilized eggs in each group to calculate the proportion of chicks hatched from each group. Only data from experiments with at least 70% fertility were included in the analysis.

EXAMPLE 4
Statistical Analysis

A total of 13 replicate experiments were completed for comparing the modified windowing technique to the standard windowing technique. In addition, 6 replicate experiments were completed for determining the effect of adding air before sealing with hot melt glue on hatchability, and 5 replicate experiments were completed for determining the effect of injection on hatchability using the modified windowing procedure. The proportion of chicks hatched from each replicate were arc sin transformed and the average and 95% confidence intervals of the replicate data were calculated from the arc sin transformed data. Data were transformed back to create the graphs. Treatment groups were compared using a Tukey-type multiple comparison testing for proportions on the combined replicate data (Zar, 1996).

EXAMPLE 5
Standard Windowing Procedure

In the standard windowing procedure, a small piece of shell and shell membrane is removed immediately above the embryo, exposing the embryo for manipulation. After manipulation, the window is sealed by any of a variety of ways, including vinyl electrical tape, transparent adhesive tape, a gas permeable adhesive film, a glass coverslip secured with paraffin, a piece of egg shell affixed with adhesive tape, or a piece of egg shell membrane sealed by glue and/or a permeable adhesive film (Marzullo, 1970; Fisher and Schoenwolf, 1983; Bosselman et al., 1989; Petitte et al., 1990; Watanabe et al., 1992;Carsience et al., 1993; Fraser et al., 1993; Thoraval et al., 1994, 1995; Maeda et al., 1998).

In reproducing the standard windowing technique without manipulating the embryo, only 14% of windowed eggs hatched, as shown in FIG. 1. The reported standard windowing procedure typically results in a low hatch rate (approximately 2–8%) (Petitte et al., 1990; Thoraval et al., 1994, 1995).

A large air bubble often remained beneath the shell membrane patch in all standard window sealing procedures. No attempt was made to remove air before sealing the window, indicating that an air space introduced within the confines of the egg was detrimental to egg viability. Furthermore, some procedures tended to produce air bubbles during incubation, resulting in many small air bubbles visible immediately below the air sac at candling. Eggs with such air bubbles had a significantly lower hatch rate than those eggs without these air bubbles, indicating that added air within the egg adversely affected embryo survival. A variety of aqueous solutions, including phosphate buffered saline at pH 7.4 (PBS), PBS diluted 1:1 with water, water, and thin egg albumen, introduced to fill the air space did not improve hatch rates.

Figure 2:
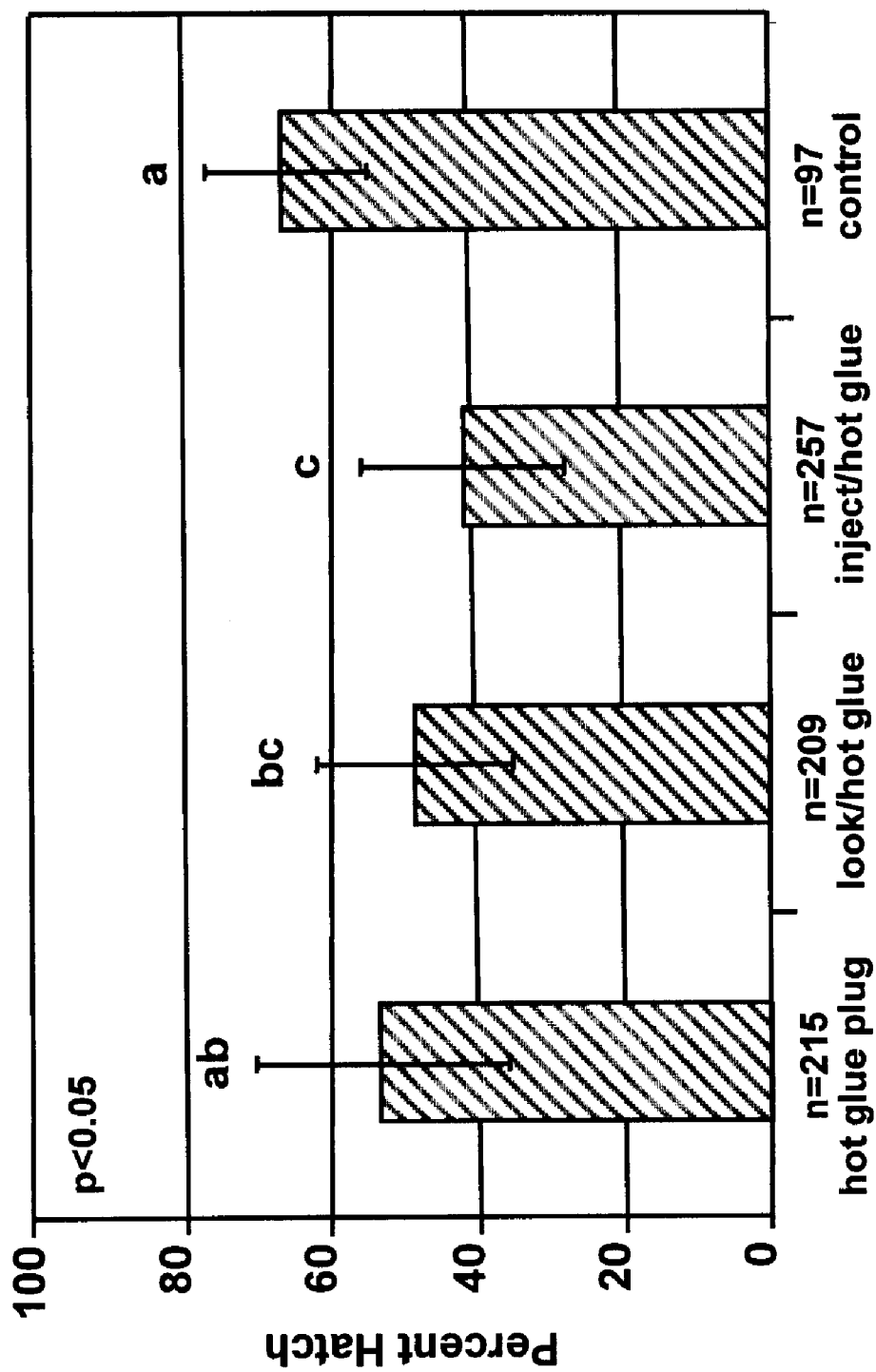
FIG. 2 illustrates the effect of injecting embryos on hatchability. Hatch rates from (left to right): windowing eggs and immediately sealing the window with hot melt glue, windowing eggs and searching for the embryo before sealing with hot melt glue, windowing eggs and searching for and injecting the embryo before sealing with hot melt glue, and non-windowed controls.

Filling the air space created during windowing with an aqueous solution did not eliminate the problem of trapping air within the egg, however, malleable hot melt glue fills the entire air space, eliminating air out of the window and providing a better seal than prior art methods. When windowed eggs were immediately sealed with a hot melt glue plug, 43% of treated eggs hatched (n=187), as shown in FIG. 1. The hot melt glue plug method hatch rate ranged from about 67% to about 88% of control hatch rates. Although Fineman and Schoenwolf (1987) reported that even a brief 10 second exposure to air could perturb normal development, the present inventors found that the embryo could be exposed for longer than 10 seconds and still achieve high hatch rates. However, the longer the window was open and exposed to the ambient environment, the more air could enter the egg, and the more difficult it became to completely remove all the air with the hot melt glue plug, resulting in a decreased hatch rate. A mock injection into a Stage X blastoderm, which increased the amount of time that the window was open, gave decreased hatch rates, as shown in FIG. 2.

To separate the effect of time from that of injection, an additional control was included, whereby, after creating the window above the embryo, the yolk was rotated past the window to simulate locating the embryo for approximately the same amount of time as that of the injected embryos.

Figure 3:
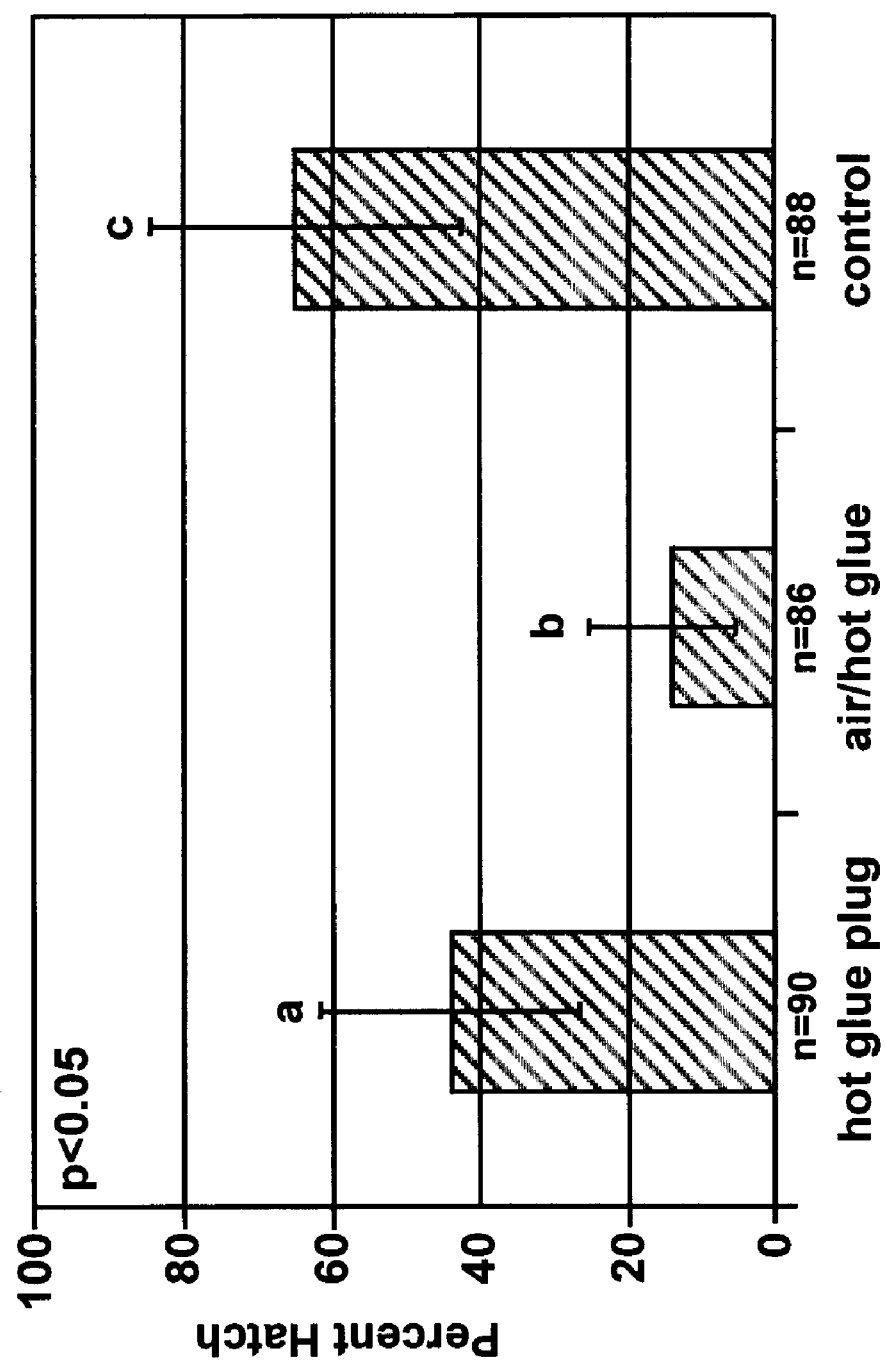
FIG. 3 illustrates the effect on hatchability of adding air to an egg. Hatch rates from (left to right), for windowing eggs and immediately sealing the window with hot melt glue, windowing eggs and adding one to two air bubbles to the egg before sealing with hot melt glue, and non-windowed controls.

When air was deliberately trapped within the egg using the windowing technique of the present invention, hatch rates decreased to that found when using the standard windowing method, as shown in FIG. 3, indicating that a reason for the low hatchability of windowed eggs is due to residual air within the egg after windowing. Some embryos appeared to be able to overcome the stresses induced by the trapped air and hatched. However, a few eggs that did not have air bubbles underneath the air sac at candling also did not hatch.

EXAMPLE 6
Air Expulsion and Window Sealing

Because the shell membrane defining the air sac is flexible, the present inventors observed that, when the egg was opened, gravity acted on the egg contents to push out the air sac at the blunt end of the egg. This resulted in the egg contents pulling down and away from the window, creating an artificial air space over the embryo. The air sac at the blunt end of the egg collapsed slightly during windowing.

Blowing air into the air sac through a partial window on the blunt end of the egg elevated the egg contents back up to the edge of the window. This procedure effectively removed any bubbles created in the egg white during the windowing procedure and effectively removed the artificial air space immediately above the embryo. After injection, air was gently blown into the air sac until the egg contents elevated to the edge of the window and the window was sealed with hot melt glue. After the hot melt glue hardened, the partial window was then sealed with hot melt glue.

REFERENCES

Bosselman et al., Science, 243:533–535 (1989).
Brazolot et al., Mol. Reprod. Dev. 30:304–312 (1991).
Carsience et al., Development, 117:669–675 (1993).
Eyal-Giladi, H., & S. Kochav,. Dev. Biol. 49:321–337. 1976
Eyal-Giladi, H., 1984. Cell Diff. 14:245–255.
Fineman et al., American Journal of Medical Genetics, 25:489–505 (1986).
Fineman et al., American Journal of Medical Genetics, 27:543–552 (1987).
Fisher, M., & G. C. Schoenwolf, Teratology 27:65–72 (1983).
Fraser et al., Int. J. Dev. Biol. 37:381–385 (1993).
Maeda et al., Poultry Sci. 77:905–907 (1998).
Mann et al., Teratology 7:A22–A23 (1973).
Marzullo, G., Nature, 225:72–73 (1970).
Naito et al., J. Exp. Zool. 254:322–326 (1990).
Naito, M, & M. M. Perry, Br. Poult. Sci. 30:251–256 (1989).
Perry, M., Nature, 331:70–72 (1988).
Petitte et al., Development, 108:185–189 (1990).
Romanoff, A. L., & A. J. Romanoff, The Avian Egg. John Wiley & Sons, Inc., New York (1949).

Thoraval et al., Poultry Sci. 73:1897–1905 (1994).
Thoraval et al., Transgenic Res., 4:369–376 (1995).
Watanabe et al., Development 114:331–338 (1992).

What is claimed is:

1. A method of manipulating an egg comprising:
   a) obtaining a first egg having a shell, egg contents, and an air sac, wherein a shell membrane underlies the shell and overlies the egg contents;
   b) making a first opening in the shell of the egg;
   c) removing the shell membrane exposed by the first opening in the shell;
   d) manipulating the egg;
   e) sealing the first opening in the egg shell with a heat melted composition and;
   f) rotating the egg contents past the first opening to allow any air bubbles created from making the first opening to pass through the heat melted composition.

2. The method of claim 1, further comprising the step of sealing the first opening in the shell with a shell membrane obtained from a second egg.

3. The method of claim 1 further comprising the steps of:
   a) making a second opening in the shell in the proximity of the air sac; and
   b) expanding the volume of the air sac and reducing the volume of air beneath the first opening in the shell.

4. The method of claim 3, wherein the volume of the air sac is expanded by injecting a gas into the air sac.

5. The method of claim 1, wherein the egg having the shell is an avian egg or a reptilian egg.

6. The method of claim 5 wherein the avian egg is selected from turkey, chicken, quail, duck, pheasant, grouse, goose, and ratite.

7. The method of claim 5 wherein the avian egg is a chicken egg.

8. The method of claim 5 wherein the avian egg contains an embryo.

9. The method of claim 8 wherein the embryo is at the blastoderm stage or later.

10. The method of claim 1 wherein the first opening is into the area around and in close proximity to the embryo.

11. The method of claim 1, wherein the heat melted composition is selected from the group consisting of a polymer, a wax, and a gelatin based composition.

12. The method of claim 1, wherein the heat melted composition is a polymer.

13. The method of claim 12, wherein the polymer is a hot melt glue composition.

14. A method for increasing hatchability after manipulating an avian egg containing an embryo comprising:
   a) obtaining a first egg having a shell, egg contents, and an air sac, wherein a shell membrane underlies the shell and overlies the egg contents;
   b) making a first opening in the shell of the egg;
   c) removing the shell membrane exposed by the first opening in the shell;
   d) manipulating the egg;
   e) sealing the first opening in the egg shell with a heat melted composition;
   f) rotating the egg contents past the first opening to allow any air bubbles created from making the first opening to pass through the heat melted composition;
   g) incubating the sealed manipulated egg to allow development of the embryo; and
   h) maintaining the incubation until the embryo is viably hatched from the egg.

15. The method of claim 14, further comprising the step of sealing the first opening in the shell with a patch comprising a fragment of a shell membrane obtained from a second egg; and wherein the patch is attached to the shell with a heat melted composition.

16. The method of claim 14 further comprising the steps of:
   a) making a second opening in the shell in the proximity of the air sac; and
   b) expanding the volume of the air sac and reducing the volume of air beneath the first opening in the shell.

17. The method of claim 16, wherein the volume of the air sac is expanded by injecting a gas into the air sac.

18. The method of claim 16, wherein the volume of the air sac is expanded by injecting a liquid into the air sac.

19. The method of claim 14, wherein the egg having the shell is an avian egg or a reptilian egg.

20. The method of claim 19 wherein the avian egg is selected from turkey, chicken, quail, duck, pheasant, grouse, or ratite.

21. The method of claim 19 wherein the avian egg is a chicken egg.

22. The method of claim 19 wherein the avian egg contains an embryo.

23. The method of claim 22 wherein the embryo is at the blastoderm stage or later.

24. The method of claim 14 wherein the first opening is into the area around and in close proximity to the embryo.

25. The method of claim 14, wherein the heat melted composition is selected from the group consisting of a polymer, a wax, and a gelatin based composition.

26. The method of claim 14, wherein the heat melted composition is a polymer.

27. A method comprising:
   a) obtaining a laid avian egg which has been stored at 6° C. usually for not more than two days and containing egg contents having a blastoderm;
   b) making an opening in the shell of the egg without breaking the underlying egg shell membrane;
   c) removing the shell membrane exposed by the first opening in the egg shell;
   d) manipulating the egg contents, sealing the first opening with a heat melted composition, and rotating the egg contents past the first opening to allow any air bubbles created from making the first opening to pass through the heat melted composition;
   e) incubating the sealed egg to allow development of the embryo; and
   f) maintaining the incubation until the embryo is viably hatched from the egg.

28. In a method for manipulating an avian egg containing an embryo, which method requires removing a portion of the egg shell to create a first hole exposing the underlying egg shell membrane and then removing a portion of the exposed egg shell membrane, the improvement comprising accessing the air sac of the egg and expanding the volume of the air sac, thereby expelling air from under the first hole, and sealing the first hole in the shell of the egg with a heat melted composition.

29. A method of manipulating an egg comprising:
   a) obtaining a first egg having a shell and an air sac, wherein a shell membrane underlies the shell;
   b) making a first opening in the shell of the egg;
   c) removing the shell membrane exposed by the first opening in the shell;

d) manipulating the egg;

e) sealing the first opening in the egg shell with a heat melted composition;

f) making a second opening in the shell in the proximity of the air sac; and g) expanding the volume of the air sac and reducing the volume of air beneath the first opening in the shell.

30. The method of claim 29, wherein the volume of the air sac is expanded by injecting a gas into the air sac.

31. The method of claim 30, wherein the polymer is a hot melt glue composition.

32. A method for increasing hatchability after manipulating an avian egg containing an embryo comprising:

a) obtaining a first egg having a shell and an air sac, wherein a shell membrane underlies the shell;

b) making a first opening in the shell of the egg;

c) removing the shell membrane exposed by the first opening in the shell;

d) manipulating the egg;

e) sealing the first opening in the egg shell with a heat melted composition;

f) making a second opening in the shell in the proximity of the air sac;

g) expanding the volume of the air sac and reducing the volume of air beneath the first opening in the shell;

h) incubating the sealed manipulated egg to allow development of the embryo; and i) maintaining the incubation until the embryo is viably hatched from the egg.

33. The method of claim 32, further comprising the step of sealing the first opening in the shell with a patch comprising a fragment of a shell membrane obtained from a second egg; and wherein the patch is attached to the shell with a heat melted composition.

34. The method of claim 32, wherein the volume of the air sac is expanded by injecting a gas into the air sac.

35. The method of claim 32, wherein the volume of the air sac is expanded by injecting a liquid into the air sac.

\* \* \* \* \*